United States Patent
Rodrigues De Oliveira et al.

(10) Patent No.: US 11,459,125 B2
(45) Date of Patent: Oct. 4, 2022

(54) DEVICE AND METHOD FOR REGULATING AIRCRAFT CONTROL SURFACES

(71) Applicant: YABORÃ INDÚSTRIA AERONÁUTICA S.A., São José dos Campos (BR)

(72) Inventors: Adir Rodrigues De Oliveira, São José dos Campos (BR); Pedro Candia De Miranda, São José dos Campos (BR); Luis Augusto Bastos Telles Nunes, São José dos Campos (BR); Gilberto Silva Costa Dos Santos, São José dos Campos (BR); Débora Saraiva Ramos, São José dos Campos (BR); Juliano Batista Almendanha, São José dos Campos (BR); Marcos Roberto Cruz, São José dos Campos (BR); Maurilio Augusto Pinto, São José dos Campos (BR)

(73) Assignee: YABORÃ INDÚSTRIA AERONÁUTICA S.A., São José Dos Campos (BR)

( * ) Notice: Subject to any disclaimer, the term of this patent is extended or adjusted under 35 U.S.C. 154(b) by 543 days.

(21) Appl. No.: 16/484,923

(22) PCT Filed: Feb. 9, 2017

(86) PCT No.: PCT/BR2017/000012
§ 371 (c)(1),
(2) Date: Aug. 9, 2019

(87) PCT Pub. No.: WO2018/145173
PCT Pub. Date: Aug. 16, 2018

(65) Prior Publication Data
US 2020/0055616 A1    Feb. 20, 2020

(51) Int. Cl.
*B64F 5/60* (2017.01)
*G01B 3/22* (2006.01)
*B64C 9/16* (2006.01)

(52) U.S. Cl.
CPC .................. *B64F 5/60* (2017.01); *G01B 3/22* (2013.01); *B64C 9/16* (2013.01)

(58) Field of Classification Search
CPC ................ B64F 5/60; G01B 3/22; B64C 9/16
See application file for complete search history.

(56) References Cited

U.S. PATENT DOCUMENTS

| | | |
|---|---|---|
| 3,478,569 A | 11/1969 | Aichinger |
| 3,851,399 A | 12/1974 | Edwards |

(Continued)

FOREIGN PATENT DOCUMENTS

| | | |
|---|---|---|
| EP | 2241854 | 10/2010 |
| EP | 2 535 275 | 12/2012 |

(Continued)

OTHER PUBLICATIONS

International Search Report for PCT/BR2017/000012 dated Oct. 19, 2017, 6 pages.
(Continued)

*Primary Examiner* — Jamel E Williams
(74) *Attorney, Agent, or Firm* — Nixon & Vanderhye P.C.

(57) ABSTRACT

This describes an aircraft control surface regulating device, comprising an elongated structural body formed of a base positioned at a first end and fixed to the structure of the aircraft and a regulation assembly arranged at a second end and positioned next to the control surfaces, the regulation assembly comprising at least one dial indicator positionable between a first measuring position and a second positioning position and at least one reference ruler arranged adjacent to at least one dial indicator and positionable between an initial position and a final position.

(Continued)

A method is also described for regulating aircraft control surfaces, comprising the steps of:
(i) fixing a regulating device on an extrados coating of the wing of the aircraft, said regulating device comprising a regulation assembly formed of at least one dial indicator and at least one reference ruler;
(ii) measuring the dial indicator in a first measuring position determining a zero position of the indicator and positioning the reference ruler in an initial position determining a zero position of the ruler;
(iii) positioning the reference ruler in a final position and positioning the dial indicator in second positioning position to perform the positioning of the control surface regulated in relation to the wing of the aircraft.

12 Claims, 3 Drawing Sheets

(56) References Cited

U.S. PATENT DOCUMENTS

| | | | |
|---|---|---|---|
| 7,766,282 | B2 | 8/2010 | Kordel et al. |
| 7,938,000 | B2 | 5/2011 | Binder |
| 8,566,054 | B1 | 10/2013 | Schweigert et al. |
| 2011/0101174 | A1* | 5/2011 | Voss .......................... B64C 9/16 244/213 |
| 2012/0241556 | A1* | 9/2012 | Kuhlmann .............. G01M 9/04 244/75.1 |
| 2016/0362196 | A1 | 12/2016 | Olszewski |

FOREIGN PATENT DOCUMENTS

| | | |
|---|---|---|
| GB | 1 332 108 | 10/1973 |
| WO | 84/01426 | 4/1984 |
| WO | 2012/009087 | 1/2012 |

OTHER PUBLICATIONS

Written Opinion of the ISA for PCT/BR2017/000012 dated Oct. 19, 2017, 5 pages.
EP Search Opinion, EP Application No. 17895644, dated Oct. 12, 2020.
Supplementary European Search Report, EP Application No. 17895644, dated Oct. 12, 2020.

* cited by examiner

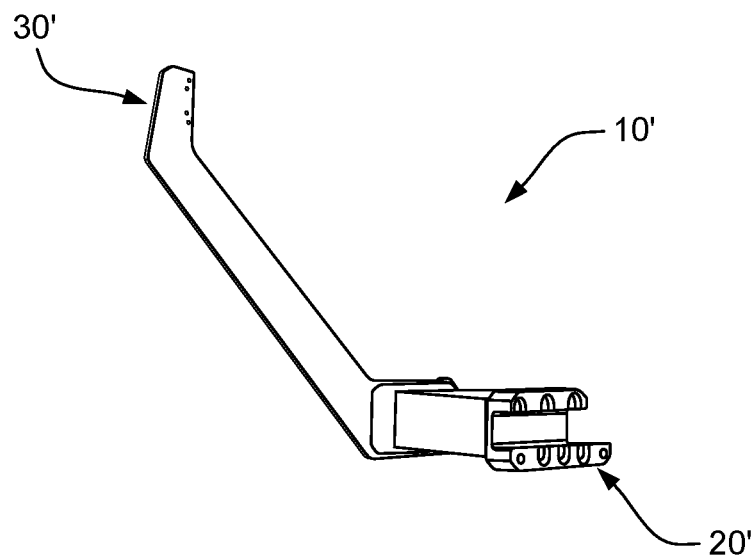
FIG. 1
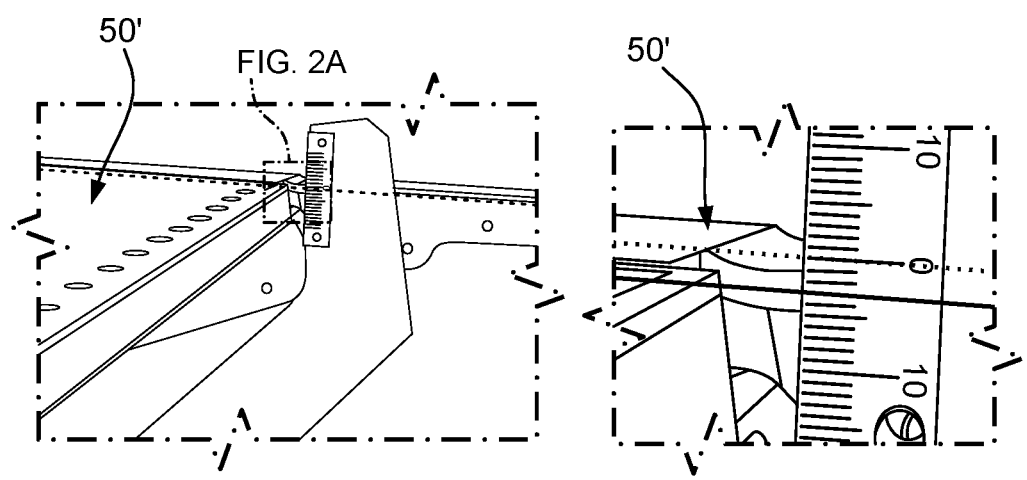
FIG. 2
FIG. 2A

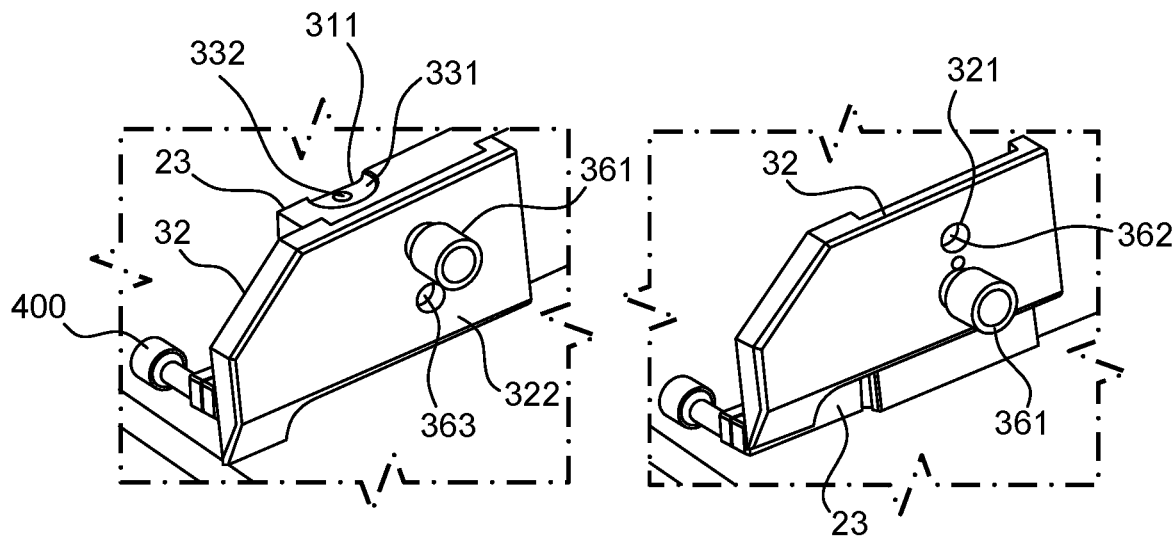
FIG. 5a  FIG. 5b
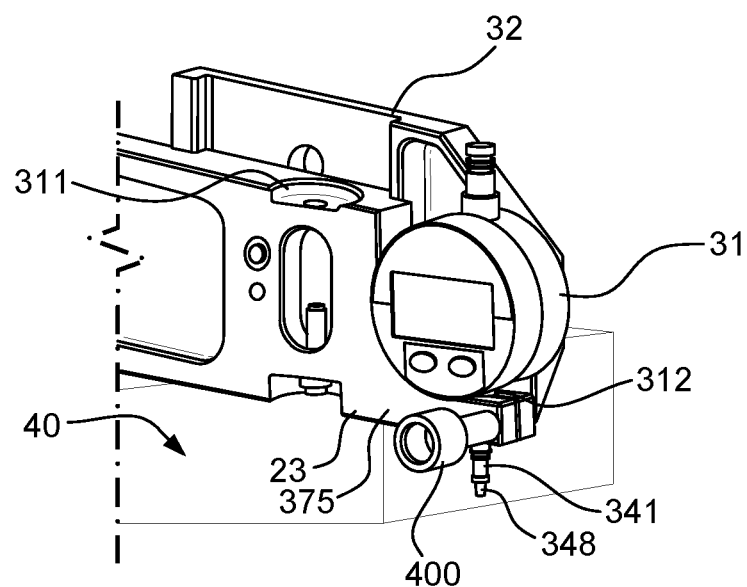
FIG. 6

DEVICE AND METHOD FOR REGULATING AIRCRAFT CONTROL SURFACES

This application is the U.S. national phase of International Application No. PCT/BR2017/000012 filed Feb. 9, 2017 which designated the U.S., the entire contents of which are hereby incorporated by reference.

The present invention concerns a device for regulating aircraft control surfaces, particularly flaps, capable of improving positioning and maintaining a better correlation of these control surfaces on aircraft wings. The invention also concerns a method of regulating control surfaces in aircraft, particularly flaps, using the regulating device.

DESCRIPTION OF THE STATE OF THE ART

The regulation of aircraft control surfaces involves the regulation and shifting of movable surfaces used in flight controls which are attached to the principal surfaces of the aircraft, such as ailerons and flaps that are attached to the wings, elevators that are associated with the horizontal stabilizers, and the rudder that is associated with vertical stabilizers.

This regulation is essential for the performance of the aircraft, since the misalignment of these control surfaces may result in a lot of drag.

Specifically considering the flaps that are control surfaces associated with the aircraft's wings, the regulating process currently known consists of executing the optimization of these control surfaces in relation to the wing structure using assemblies that are usually mounted in the lower region of the wing, such as the tracks.

In this regard, a device is used to measure the positioning of the flaps which are equipped with holes to fix them to the tracks and a grading scale to perform the necessary reading for positioning the flaps on the wing. This regulation positions the flap with a tolerance within the range of ±4, 5 mm, through the computation of the values of the angles of incidence of the wing.

The document U.S. Pat. No. 5,564,655, for example, performs the regulation of the flaps using a device that uses the tracks as a reference. It was observed, however, that in the known regulation used in this document the tolerance stack-up effect occurs, which is not considered in the process, resulting in a lack of precision in the regulation and resulting in the flaps not being in a satisfactory position for the needs of some aircraft.

In this case, the solution proposed in document U.S. Pat. No. 5,564,655, in addition to the aforementioned disadvantages, also produces an increase in the execution time of the regulation and proposes the use of a device that is difficult to handle because of its large weight and size.

OBJECTIVES OF THE INVENTION

So, the present invention seeks to provide a device for regulating aircraft control surfaces capable of improving positioning and maintaining a better correlation of these control surfaces on the wings of the aircraft.

It is also an objective of this invention to provide a method of regulating control surfaces in aircraft using the regulating device.

BRIEF DESCRIPTION OF THE INVENTION

The present invention is intended to provide a device for regulating aircraft control surfaces, comprising an elongated structural body that is formed of a base positioned on a first end and fixed to the structure of the aircraft, and of a regulation assembly arranged at a second end positioned next to the control surfaces, the regulation assembly comprising at least one dial indicator positionable between a first measuring position and a second positioning position and at least one reference ruler (32) arranged adjacent to at least the dial indicator compared to and positionable between a starting position and a final position.

This invention is also intended to provide a method of regulating aircraft control surfaces, comprising the steps of:

(i) fixing a regulating device in an extrados coating of the wing of the plane, said regulating device comprising a regulation assembly consisting of at least one dial indicator and at least one reference ruler;

(ii) measuring the dial indicator in a first measuring position by determining a zero position of the dial and positioning the reference ruler in an initial position determining a zero position of the ruler;

(iii) positioning the reference ruler in a final position, and positioning the dial indicator in a second positioning position to perform the positioning of the regulated control surface in relation to the aircraft wing.

BRIEF DESCRIPTION OF THE DRAWINGS

The present invention will duly be described in more detail based on an example of execution represented in the drawings. The figures show the following:

FIG. 1—illustrates the measuring device of the state-of-the-art;

FIG. 2—illustrates the regulation of the flap using the device of the state-of-the-art illustrated in FIG. 1;

FIG. 2A—illustrates the deviation generated in the regulation of the flap using the device of the state of the art illustrated in FIG. 1;

FIGS. 5a and 5b—illustrate the regulation assembly containing the reference ruler in an initial position and in a final position;

FIG. 6—is a detailed view of the regulation assembly comprising the aircraft control surface regulating device, that is the object of this invention, and the regulation assembly containing a dial indicator positioned in a second positioning position.

DETAILED DESCRIPTION OF THE INVENTION

Figure 3:
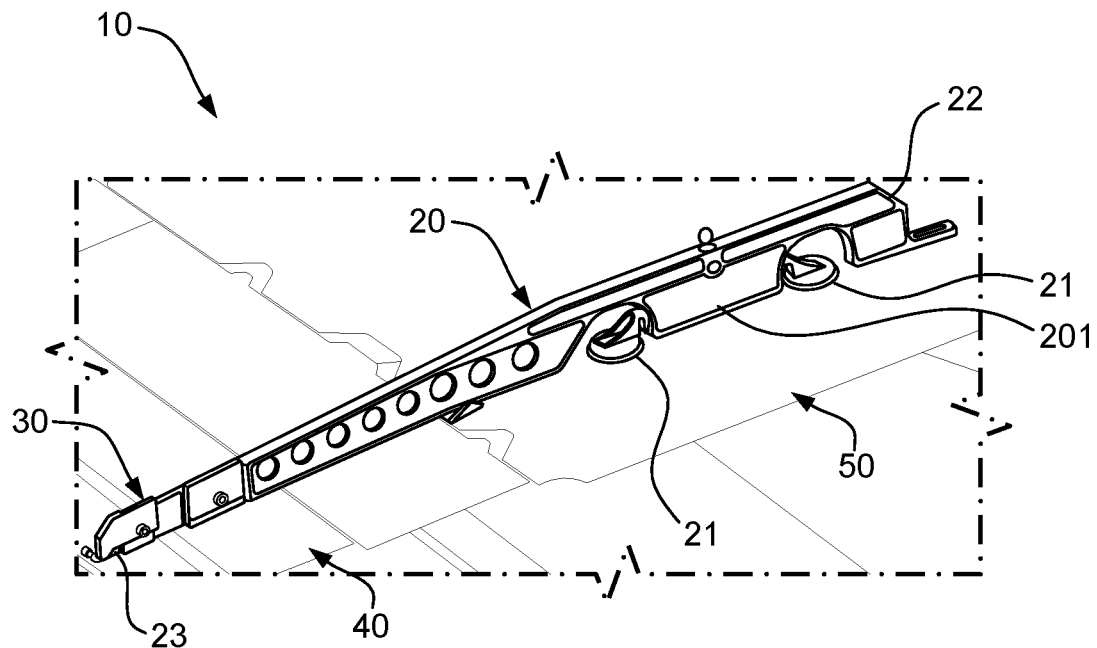
FIG. 3—is a perspective view of the aircraft control surface regulating device which is the object of the present invention.

In accordance with a preferential embodiment and as illustrated in FIGS. 3 to 6, the aircraft 50 control surface 40 regulation device 10, that is the object of this invention, is intended to regulate the control surfaces 40, particularly the flaps, in relation to the structure of the aircraft 50, particularly in relation to the wing of the aircraft, in a precise and optimized manner.

The regulating devices 10' already known and illustrated in FIGS. 1, 2 and 2A, use the tracks of the flaps as a reference to position these control surfaces in relation to the wing of the aircraft. In this case, a fixing portion 20' of this regulation device 10' is fixed to the track while the graded rod 30' regulates the positioning of the flap in relation to the wing 50.

However, it is known that this type of regulating device 10' and this type of regulation provide an overlap of tolerances that results in an imprecise regulation as illustrated in FIG. 2A, with a greater difference in positioning than was planned.

Unlike the devices known to the state of the art, the aircraft 50 control surface 40 regulating device 10, that is the object of this invention, comprises a structural body 20 fixed to the structure of the aircraft, preferably fixed to the extrados of the wing 50 of the aircraft and uses this extrados of the wing 50 as a reference, because it is a reference that has better dimensional stability than the tracks used as a reference by the devices of the state of the art.

This structural body 20 is narrow and elongated, formed of a base 201 positioned at a first end 22 and of a regulation assembly 30 positioned at a second end 23 which is longitudinally opposite to the first end 22.

The base 201 is fixed to the aircraft structure, more precisely to the extrados of the wing of the aircraft 50 by means of at least one fixing element 21 and preferably a pair of fixing elements 21 consisting of robust suction cups that guarantee a reliable fixing of the regulation device 10.

Since the base 201 is fixed to the extrados of the wing 50 of the aircraft, the second end 23 of the structural body 20 is positioned next to the control surfaces 40 and, consequently, the regulation assembly 30 which is positioned at the second end 23 of the structural body 20 is also positioned next to the control surfaces 40 that will have their positions regulated in relation to the aircraft wing.

The regulation assembly 30 comprises at least one dial indicator 31 which is positionable between a first measuring position 311 and a second positioning position 312, so that the dial indicator 31 is cooperative with the control surface 40 when positioned in the second positioning position 312.

In addition to this, the regulation assembly 30 also comprises at least one reference ruler 32 positioned adjacent to at least one dial indicator 31 and positionable between an initial position 321 and a final position 322 so that the reference ruler 32 is cooperative with the control surface 40 when positioned in the initial position 321.

The positioning of the dial indicator 31 in the first measuring position 311 is concomitant with the positioning of at least one reference ruler 32 in the initial position 321, while the positioning of the dial indicator 31, in the second positioning position 312 is also concomitant with the positioning of the reference ruler 32 in the final position 322.

The first measuring position 311 consists of a semi-circular recess 331 with a perpendicular hole 332 positioned in the center of the recess 331. The hole 332 receives the rod 341 of the dial indicator 31 while the semi-circular recess 331 provides a precise and fixed seat for the case 342 of the dial indicator 31. This semi-circular recess 33 is formed at the second end 23 of the structural body 20.

Figure 4:
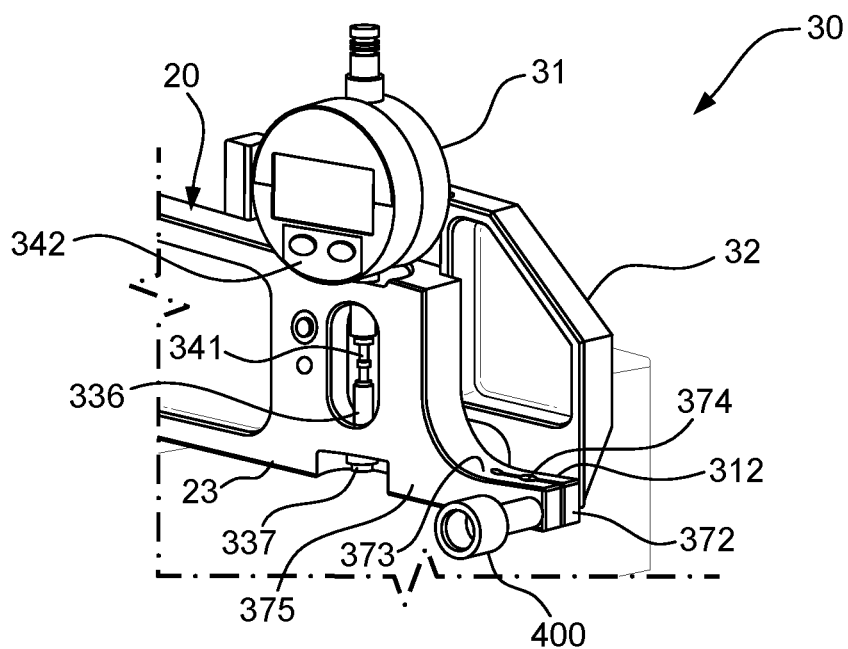
FIG. 4—is a detailed view of the regulation assembly comprising the aircraft control surface regulating device, that is the object of this invention, and the regulation assembly containing a dial indicator positioned in a first measuring position.

As illustrated in FIG. 4, when the dial indicator 31 is positioned in the first measuring position 311, its rod 341 is placed against a measuring block 336 whose positioning is regulated by a screw 337, in order to measure and determine a zero position of the indicator. This zero position of the indicator is a position determined in the design and means that it is the ideal value to perform the regulation of the control surface or the flap 40.

In accordance with FIGS. 5a and 5b, in the procedure for measuring the dial indicator 31 and determining the zero position of the indicator, the reference ruler 32 is positioned in the initial position 321 (FIG. 5a) and the reference ruler 32 in this position has the function of enabling the approximation of the flap 40 to the zero position of the indicator, in order to facilitate the activity of the measuring operation. This is because the reference ruler 32 has the purpose of performing a visual approximation for the operator, which is to say, the zero position of the indicator is the same zero position as the ruler. The approximation of the flap 40 is achieved in this way to ensure an approximation with greater precision, because the course of the dial indicator 31 is short.

After the approximation phase, the reference ruler 32 is fixed in the final position 322, as illustrated in FIG. 5b.

The reference ruler 32 is positioned adjacent to the dial indicator 31, next to the second end 23 of the structural body 20. The initial position 321 of the reference ruler 32 consists of a first thru-hole 362 coincident with a non-thru hole (not illustrated) positioned at the second end 23, where a screw 361 is inserted in the first thru-hole 362 and in the non-thru-hole (not illustrated) to fix the reference ruler 32 in the initial position 321 illustrated in FIG. 5a. Similarly, the final position 322 of the reference ruler 32 consists of a second thru-hole 363 which also coincides with the non-thru-hole (not illustrated) positioned at the second end 23 when the reference ruler 32 is moved linearly in a rising direction, as illustrated in FIG. 5b. In this position, the screw 361 is inserted in the second thru-hole 363 and in the non-thru-hole (not illustrated) to secure the reference ruler 32 in the final position 322.

After the approximation phase of the flap 40, the dial indicator 31 is positioned in the second positioning position 312, when, thereafter, the dial indicator 31 is cooperative with the control surface 40.

The positioning position 312 consists of a slot 372 made in a flat portion 373 of the second end 23, and perpendicular to this slot is a thru-hole 374 which receives the rod 341 of the dial indicator 31. A fixing screw 400 positioned on the side wall 375 of the second end 23 has the function of compressing the slot, and securing the rod of the dial indicator 31 to it, so as not to interfere with the measuring performed by the indicator 31.

For the regulation of the control surface or flap 40 in relation to the extrados of the aircraft wing 50, the flap 40, which has already been brought closer to the wing 50, touches the tip 348 of the dial indicator 31 and is shifted and regulated compressing the tip 348 in order to lead the dial indicator 31 to mark the zero position of the indicator. When the dial indicator 31 again marks the zero position of the indicator, the flap 40 is in the optimum design position relative to the extrados of the wing 50 and its regulation is optimized and precise.

Another object of this invention is a method of regulating aircraft control surfaces. This method comprises the following steps:

(i) Fixing a regulation device 10 in an extrados coating of the wing 50 of the aircraft. The regulating device 10 has already been described above and comprises a regulation assembly 30 consisting of at least one dial indicator 31 and at least one reference ruler 32.

(ii) Measuring the dial indicator 31 in a first measuring position 311 determining a zero position of the indicator and positioning the reference ruler 32 in an initial position 321 determining a zero position of the ruler;

(iii) positioning the reference ruler 32 in a final position 322 and positioning the dial indicator in a second positioning position 312 to perform the positioning of the control surface 40 regulated in relation to the wing of the aircraft 50.

In step (i), the fixing of the regulating device 10 is done based on the fixing of the base 201 on the extrados coating of the wing 50 of the aircraft by means of at least one fixing element 21 consisting of suction cups.

During step (ii), the phase of approximating the control surface or flap 40 to the zero position of the indicator occurs. It is an approximation phase because the flap 40 is not yet regulated; it was only brought closer to the structure of the wing 50 when the reference ruler 32 is positioned in the initial position 321. This approximation is achieved visually and is intended to ensure precise regulation of the flap 40.

In this phase of approximating the control surface 40 to the zero position of the indicator, the reference ruler 32 is cooperative with the control surface or flap 40.

In step (iii), the dial indicator 31 is cooperative with the control surface or flap 40. At this stage the flap 40 is positioned and regulated in relation to the extrados of the wing 50 of the aircraft. To this end, the flap 40, which has already been approximated to the wing 50, touches the tip 348 of the indicator 31 and is moved and regulated by compressing the tip 348 in order to lead the dial indicator 31 to mark the zero position of the indicator. When the dial indicator 31 returns to the zero position of the indicator, the flap 40 is in the optimum design position relative to the extrados of the wing 50 wing and its regulation is optimized and precise. The optimization allows for greater precision in the positioning of the flap 40 and the dial indicator 31 ensures the positioning values with greater precision.

In addition to this, the device and method that are the objects of this invention avoid the use of angles of incidence of the wing to calculate the position of the flaps 40; they provide equalization between the semi wings and reduce the cost of non-quality. The device is lightweight and easy to manipulate, allowing for precise positioning, and can be used on any type of aircraft.

Having described an example of a preferred embodiment, it should be understood that the scope of the present invention encompasses other possible variations, being limited only by the contents of the attached claims, including the possible equivalents.

The invention claimed is:

1. A device for regulating a control surface of an aircraft, wherein the regulating device comprises:
   an elongated structural body having first and second ends, the elongated structural body including a base positioned at the first end of the elongated structural body and adapted to being fixed to structure of the aircraft, and a regulation assembly arranged at the second end of the elongated structural body end positioned next to the control surface, wherein
   the regulation assembly comprises:
   (i) at least one dial indicator positionable between a first measuring position and a second positioning position,
   (ii) and at least one reference ruler positioned adjacent to the at least one dial indicator and positionable between a starting position and a final position.

2. The device according to claim 1, wherein the dial indicator is cooperative with the control surface when positioned in the second positioning position.

3. The device according to claim 1, wherein the reference ruler is cooperative with the control surface when positioned in the initial position.

4. The device according to claim 1, wherein the positioning of at least one dial indicator in the first measuring position is concomitant with the positioning of at least one reference ruler in the initial position.

5. The device according to claim 1, wherein the positioning of at least one dial indicator in the second positioning position is concomitant with the positioning of at least one reference ruler in the final position.

6. The device according to claim 1, wherein the base is fixed to the structure of the aircraft by means of at least one fixing element consisting of suction cups.

7. The device, according to claim 1, wherein the base is fixed to the wing of the aircraft.

8. A method for regulating an aircraft control surface comprising the steps of:
   (i) fixing a regulating device on an extrados coating of a wing of the aircraft, wherein the regulating device comprises a regulation assembly formed of at least one dial indicator and at least one reference ruler;
   (ii) measuring the dial indicator in a first measuring position determining a zero position of the indicator and positioning of the reference ruler in an initial position determining a zero position of the ruler; and
   (iii) positioning the reference ruler in a final position and positioning the dial indicator in a second positioning position to perform the positioning of the control surface regulated in relation to the wing of the aircraft.

9. The method, according to claim 8, wherein step (i) comprises fixing the regulating device by fixing a base on the extrados coating of the wing of the aircraft by means of at least one fixing element, the base being positioned at a first end of a structural body of the regulating device.

10. The method, according to claim 9, wherein step (ii) comprises a phase of approximating the control surface to the zero position of the indicator when the reference ruler is positioned at the starting position.

11. The method, according to claim 10, wherein the phase of approximating the control surface to the zero position of the indicator includes the reference ruler being cooperative with the control surface.

12. The method, according to claim 8, wherein step (iii) comprises the dial indicator being cooperative with the control surface, the control surface being regulated in relation to the extrados of the wing of the aircraft and in contact with the dial indicator in order to lead the dial indicator to again mark the zero position of the indicator.

* * * * *